United States Patent [19]

Ashley et al.

[11] Patent Number: 5,535,194
[45] Date of Patent: Jul. 9, 1996

[54] METHOD AND APPARATUS FOR ECHO CANCELING WITH DOUBLE-TALK IMMUNITY

[75] Inventors: James P. Ashley, Naperville; Lee M. Proctor, Cary, both of Ill.

[73] Assignee: Motorola, Inc., Schaumburg, Ill.

[21] Appl. No.: 275,223

[22] Filed: Jul. 14, 1994

[51] Int. Cl.$^6$ .................................. H04B 3/23; H04L 5/14
[52] U.S. Cl. ...................................... 370/32.1; 379/411
[58] Field of Search ................................ 370/6, 24, 32, 370/32.1, 95.1, 95.3, 18; 379/58, 59, 60, 406, 407, 410, 411; 375/346, 350, 205, 207; 455/33.1, 33.2, 50.1, 53.1, 54.1, 63

[56] References Cited

U.S. PATENT DOCUMENTS 4,918,727  4/1990  Rohrs et al. ........................... 379/410

5,295,136  3/1994  Ashley et al. ........................... 370/32.1

*Primary Examiner*—Alpus H. Hsu
*Attorney, Agent, or Firm*—Heather L. Creps; Raymond J. Warren

[57] ABSTRACT

A method and apparatus are provided for echo canceling which includes double-talk immunity. The echo canceller (15) according to the present invention includes a double-talk detector (17) which uses an adaptive double-talk detection threshold (214) and an accurate estimation of reference energy (106) to detect double-talk. The echo canceller further provides for correcting partial echo canceller adaptive filter vector divergence occurring prior to double-talk detection by maintaining and switching to an auxiliary echo canceller filter with known "good" filter coefficients (58, 60, 62).

16 Claims, 7 Drawing Sheets

METHOD AND APPARATUS FOR ECHO CANCELING WITH DOUBLE-TALK IMMUNITY

RELATED PATENTS

The present invention is related to the invention disclosed in commonly assigned U.S. Pat. No. 5,295,136 entitled "METHOD OF PERFORMING CONVERGENCE IN A, LEAST MEAN SQUARE, ADAPTIVE FILTER, ECHO CANCELLER" the disclosure of which is hereby expressly incorporated herein by reference.

FIELD OF THE INVENTION

The present invention relates generally to communication systems, and more particularly, to an adaptive echo canceller with double-talk immunity.

BACKGROUND OF THE INVENTION

Echo cancellation in long distance telephonic communications is well known in the art. The need for such echo cancellation arises from impedance mismatches associated with wireline telephone subscribers and an economic decision by telephone carriers to use two-wire connections between wireline subscribers and the central telephone offices.

Two-wire connections require mixing of a duplex telephone signal (transmit and receive) for exchange between the central telephone office and the wireline subscriber. The mixing of transmit and receive signals results in a portion of a received signal being re-transmitted as an outgoing signal from a receiving subscriber to a transmitting subscriber. While the re-transmitted signal may be perceived as a "hollow" sound to local communicators, the retransmitted signal may represent a distracting echo in long distance communications.

The delay experienced by a subscriber between a transmission and an echo may be a determining factor in the acceptability and usability of the communication channel. Short delays experienced between local communicators (on the order of 1–20 milliseconds) typically do not represent an impediment to the efficient exchange of spoken words. Longer delays, (on the order of 250–500 milliseconds), however, may result in syllables and even entire words being repeated as an echo and may render the communication channel unusable.

The advent of digital mobile communications systems has exacerbated the problem of time delays, and hence, the need for echo cancellation. Vocoder delays, convolutional coding algorithms, etc. typically introduce round trip signal delays in mobile communication circuits on the order of 200 milliseconds.

The solution to the echo problem has been to provide computer based echo cancellers. Echo cancellers are typically based on adaptive finite impulse filter (AFIR) theory. A comprehensive discussion of AFIR theory is provided in *Adaptive Filter Theory*, 2nd ed., by Simon Haykin, Prentice Hall, 1991. AFIRs provide for echo cancellation by generating a mathematical model of the echo characteristics of a communication system as a step in canceling the echo.

AFIRs, however, suffered a number of disadvantages including poor filter convergence time and filter instability. The invention of the afore-mentioned U.S. Pat. No. 5,295, 136 solved these problems by providing an improved method for converging an adaptive filter echo canceller. The method disclosed provided for identifying the location of a primary echo in the echo filter vector, dividing the vector into primary and secondary vectors and increasing the adaptation rate relative to filter locations proximate to the primary echo. The primary echo has been determined to contain substantially all of the echo energy, and increasing the adaptation rate proximate to the primary echo provides fast filter convergence without instability.

Double-talk correction in echo cancellers, as presently known, is a process designed to inhibit update of the adaptive filter coefficients in an echo canceller, such as disclosed in U.S. Pat. No. 5,295,136, when the "near-end" speaker is talking. If adaptation of the filter vector coefficients is not inhibited upon detection of near-end speech, the filter vector will diverge leading to poor communication quality. Double-talk detectors designed to inhibit adaptation of the echo canceller filter during periods of near-end speech are traditionally based on comparing an estimated power of the received echo signal to some fixed threshold of the maximum estimated transmit power. This can be represented as:

$$r_s(0) > d_{th} \times r_x(0)_{max}$$

where $r_s(0)$ is the estimated power of the echo signal, $r_x(0)_{max}$ is the maximum estimated transmit power and $d_{th}$ is a double-talk threshold constant. Once double-talk is detected, adaptation of the echo canceller is inhibited for a "hangover" period. A disadvantage of a fixed threshold double-talk detector is that the threshold must satisfy the worst case echo return loss (ERL), which is usually about 6 dB. However, typical ERL can be much higher and has readily been observed at 22 dB or more. Therefore, significant filter divergence can occur during double-talk, prior to detection, particularly when the near-end speech is at relatively low energy levels compared to that of the far-end.

Testing reveals that enough echo canceller filter divergence occurs prior to the detection of double-talk to cause significant distortion of the echo canceller output. Because of this filter divergence prior to double-talk detection and inhibited filter adaptation during double-talk, the echo canceller output can remain significantly distorted for at least the hangover period and potentially longer as the filter must readapt once double-talk is no longer detected and the hangover period has expired. Therefore, there is a need for a method and apparatus for quickly detecting double-talk so as to limit filter divergence and for correcting the echo canceller filter to account for the presence of double-talk and to limit effects of echo canceller filter divergence occurring prior to double-talk detection.

DETAILED DESCRIPTION OF THE PREFERRED EMBODIMENTS

The present invention is directed to a method and apparatus for detecting double-talk and for adapting the filter vector coefficients of an echo canceller in response to the detection of double-talk. A preferred embodiment of the present invention is described as follows; it being understood, however, that the invention may be otherwise embodied without departing from the fair scope of its teachings.

Figure 1:
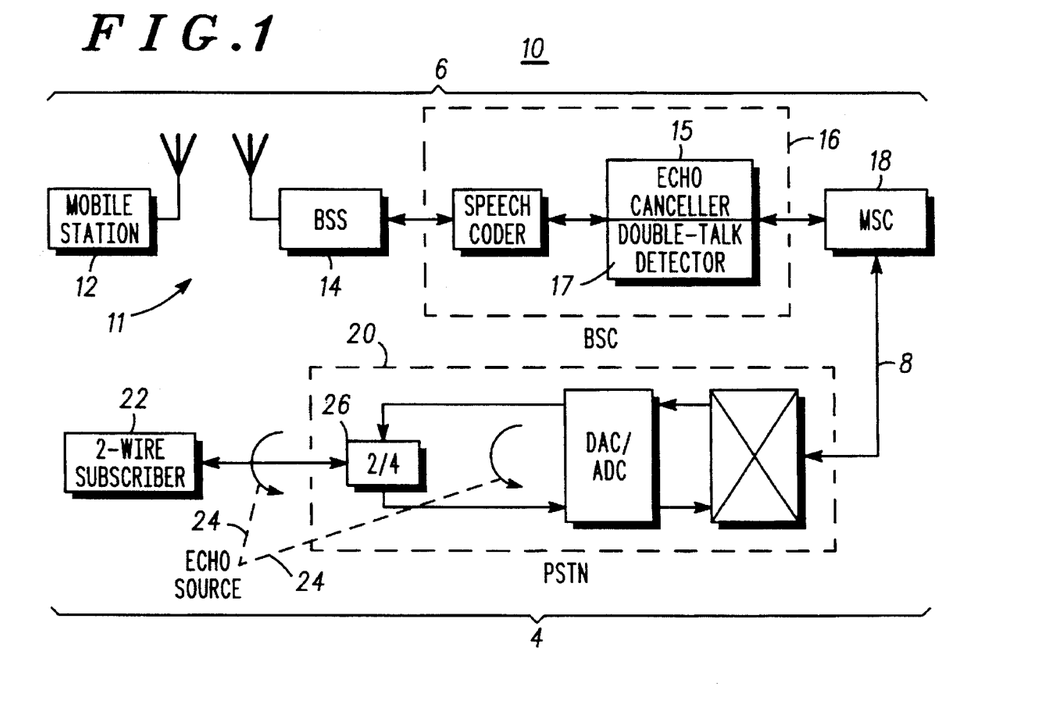
FIG. 1 is a block diagram of a communication system incorporating an echo canceller with double-talk immunity in accordance with the present invention.

FIG. 1 shows a communication system, generally 10, using echo cancellation with double-talk immunity in accordance with the present invention. The system 10 has a near-end portion 4 generally including a public switched telephone network 20 and wireline subscriber unit 22. The system 10 also has a far-end portion 6 which generally includes a cellular communication system 11 having a plurality of mobile communication stations (MS) (one of which is shown as 12), a base station (BSS) 14, a base site controller (BSC) 16, and a mobile switching center (MSC) 18. The near-end portion 4 communicates with the far-end portion 6 over communication links 8.

It should be understood from the outset that the present invention is applicable in any communication system including cellular (for example, analog or digital systems such as time division multiple access (TDMA) and code division multiple access (CDMA) systems) and/or wireline communication systems. In the far-end portion 6 of communication system 10, signals are exchanged between mobile stations (12) and a base station 14. Speech signals encoded within the mobile stations 12 are decoded within the base site controller 16 for transmission to a wireline subscriber 22. Signals originating from the near-end portion 4, i.e., the wireline subscriber unit 22, are communicated to the far-end portion 6 and encoded within the base site controller 16 for transmission to the mobile station 12.

Signals generated from the wireline subscriber unit 22 cause echo signals 24 at 2/4 wire interface 26 within the PSTN 20. This echo signal is canceled within the base site controller 16 by an echo canceller 15 which includes a double-talk detector 17. Echo canceller 15 is preferably of the type described in the U.S. Pat. No. 5,295,136 from which a complete discussion of the structure and function of the echo canceller 15 may be obtained. In accordance with the present invention, double-talk immunity for the echo canceller is provided in a preferred implementation illustrated in FIG. 3, 100. As will be seen, double-talk detection in the present invention employs an adaptive double-talk threshold.

Figure 2:
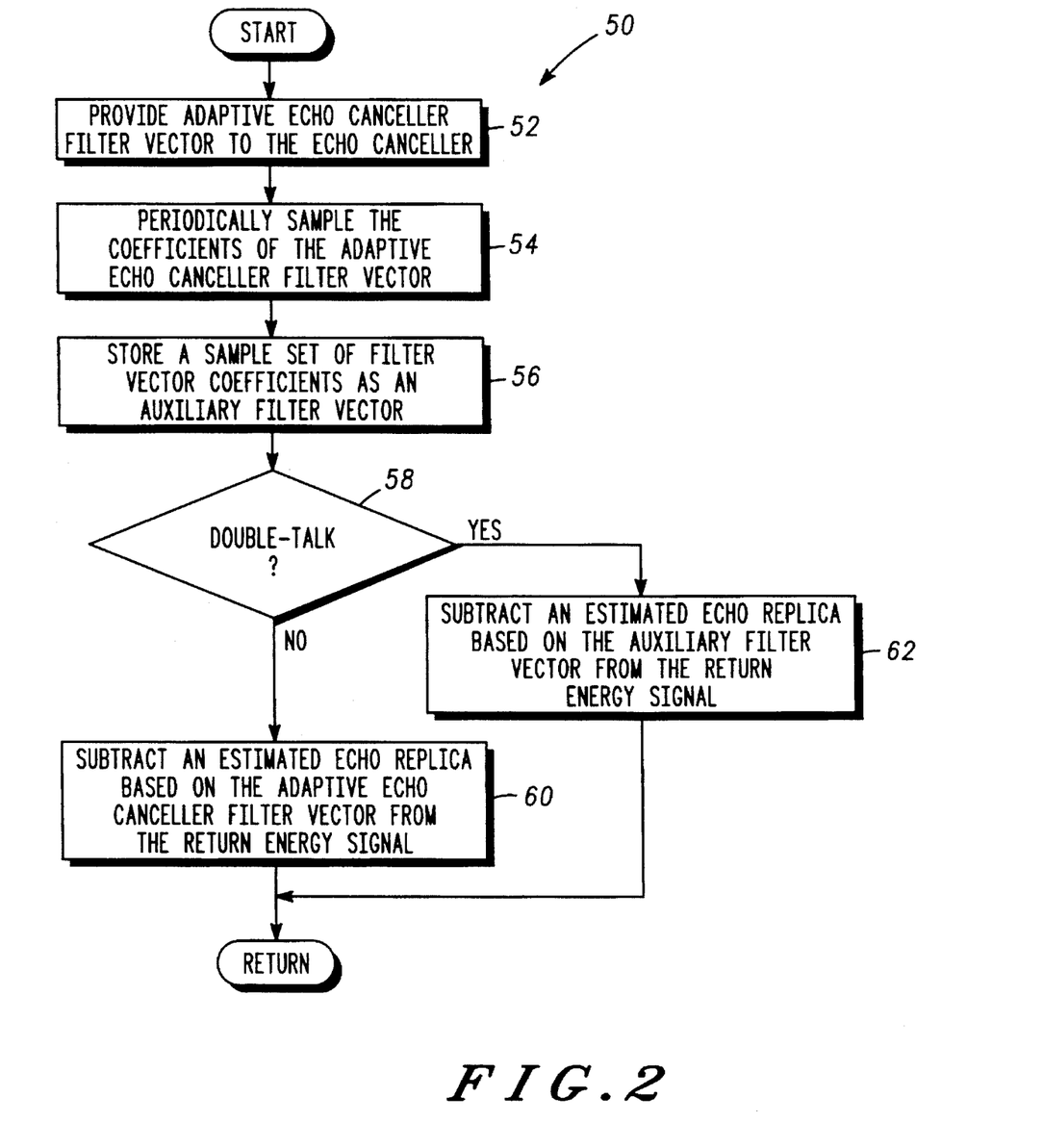
FIG. 2 is a flow chart generally illustrating the echo cancellation with double-talk immunity in accordance with a preferred embodiment of the present invention.

With reference to FIG. 2, echo cancellation with double-talk immunity in accordance with a preferred embodiment of the present invention is illustrated, 50. The echo canceller 15 is initially provided with an adaptive echo canceller filter vector having a set of coefficients 52. The coefficients of the adaptive echo canceller filter vector are periodically updated as explained in the afore-mention U.S. Pat. No. 5,295,136. These coefficients are also periodically sampled 54, in the absence of double-talk, and these known "good" coefficients are stored in an auxiliary echo canceller filter vector 56. If double-talk is absent 58, echo canceller 15 produces an estimated echo replica based on the adaptive echo canceller filter vector and subtracts this estimated echo replica from the return energy signal 60. If double-talk is present 58, echo canceller 15 produces an estimated echo replica based on the auxiliary echo canceller filter vector and subtracts this estimated echo replica from the return energy signal 62.

Figure 3:
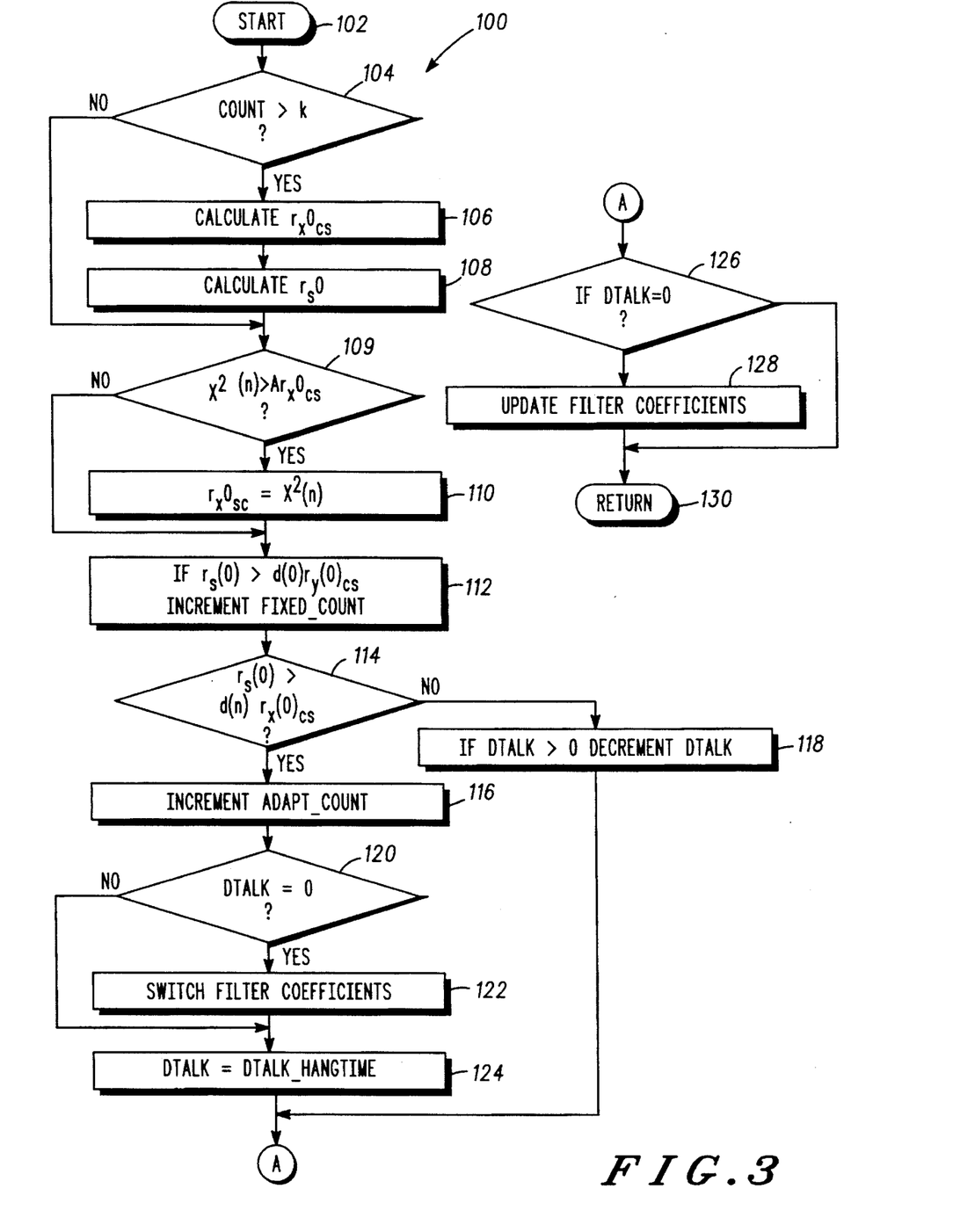
FIG. 3 is a flow chart further illustrating the process of echo canceling with double-talk immunity in accordance with the present invention.
Figure 5:
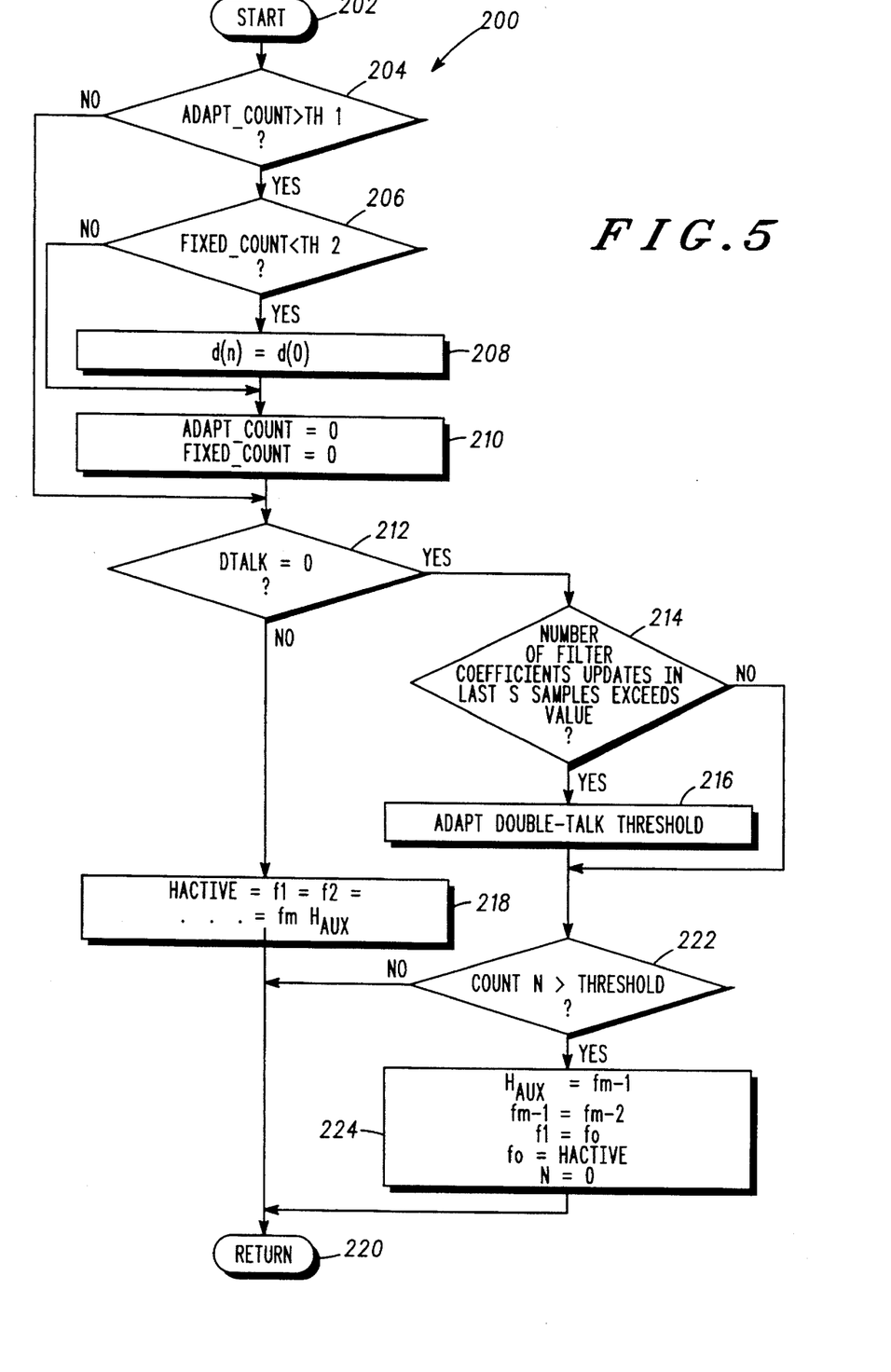
FIG. 5 is a flow chart illustrating processing features of the echo canceller with double-talk immunity in accordance with the present invention.

To detect double talk, double-talk detector 17 is operable to compare an estimated power of the return signal to a threshold of the estimated maximum transmit power. With reference to FIG. 3, the double-talk detection process begins at 102, and double-talk is detected at 114, when $$r_s(0) = d(n) \times r_x(0)_{cs}, \tag{a}$$

where $r_s(0)$ is an estimated power of the return signal 106, $r_x(0)_{cs}$ is an estimated maximum transmit power 108, described more fully below, and $d(n)$ is an adaptive double-talk threshold. The values of $r_s(0)$ and $r_x(0)_{cs}$ are updated every $k^{th}$ iteration of the double-talk detection process, 104. The double-talk detector 17 is operable for forming an adaptive double-talk reference value proportional to the energy of the adaptive echo canceller filter vector. In the preferred embodiment, an adaptive double-talk threshold $d(n)$ is calculated as:

$$d(n) = \gamma d(n-1) + (1-\gamma)BE_h, \tag{b}$$

where $E_h$ is the energy of the echo canceller filter at time n; $d(0)=0.25$ B, B is a headroom bias factor preferably approximately about 2, or 3 dB; and $\gamma$ is an integration constant preferably approximately about 0.97. A higher bias factor B may be chosen during the multiple echo case due to potential additive comb filtering effects. The adaptive double-talk threshold $d(n)$ is updated during the background processing routine 200 illustrated in FIG. 5. As can be seen in FIG. 5, if the number of updates to the echo canceller adaptive filter vector coefficients in the last S samples exceeds a value 214, in the preferred embodiment more the 75% of the preceding samples having coefficients updates, and double-talk is not detected 212, i.e., dtalk=0, the adaptive double-talk threshold is adapted according to equation (b), 216.

Figure 4:
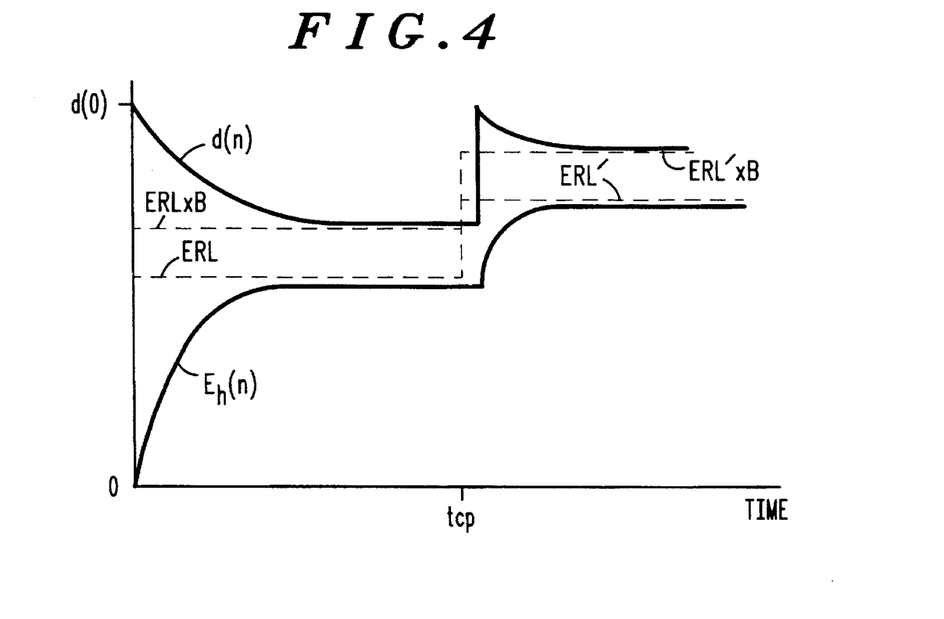
FIG. 4 is a graphical representation of the double-talk threshold adaptation in accordance with a preferred embodiment of the present invention.

FIG. 4 illustrates the adaptation of $d(n)$ during echo cancellation. As shown in FIG. 4, filter energy ($E_h$), ERL and $d(n)$ are plotted against time. As can be observed, at time, n=0, $d(n)$ is at its initial value which in the preferred embodiment is approximately 0.25 B. The filter energy, which has not yet started to adapted is at an initial value of approximately zero (0). The ERL is shown typically as approximately 0.25 attenuation. As the echo canceller filter adapts, its energy increases and asymptotically approaches the ERL from below. According to equation (b), $d(n)$, in an over damped response, asymptotically approaches approximately ERL×B from above. Since the $d(n)$ response is over damped, it responds more slowly than the echo canceller filter energy, $E_h$, to prevent the value of $d(n)$ from dropping below the value of $E_h$ and potentially introducing false double-talk triggers.

The adaptation of the double-talk threshold $d(n)$ may be further enhanced by accounting for dynamic responses which may be encountered if, for example, a two party communication transitions to a three-party-conference (TPC) and/or multiple 2/4-wire hybrids are introduced. For example, after a relatively high ERL echo is fully canceled, if a circuit with relatively low ERL is switched in as a TPC, the current adaptive double-talk threshold would be too low.

This is illustrated in FIG. 4. At time n=tpc, a TPC is introduced into the system. The ERL of the system changes to some new value (ERL') with an equivalent value greater than the present adapted value of d(n). This higher echo return energy signal will be detected as double-talk if d(n) is not again adapted to account for the change in the ERL of the system. The present invention provides a pair of counters which are incremented each time double-talk is detected based upon a fixed threshold, d(0)=0.25 B, and based upon the adaptive threshold d(n), FIG. 3, 112 and 116, respectively. In the background processing routine, FIG. 5, if the adaptive threshold count is greater than a first threshold value, 204, and the fixed threshold count is less than a second threshold value, 206, the adaptive double-talk threshold is reset to the initial, worst case value, d(0), 208. The adaptive threshold count and the fixed threshold count are reset to zero (0), 210, and the adaptive double-talk threshold process readapts the double-talk threshold, according to equation (b), to the new ERL of the system as further shown in FIG. 4.

As discussed, double-talk is detected when $r_s(0)$ is greater than a threshold value of an estimated maximum signal energy $r_x(0)_{max}$. The typical method of estimating $r_x(0)_{max}$ is based on $x_n^T x_n$, where $x_n$ is the reference signal vector. However, $x_n^T x_n$ proves to be an inaccurate and potentially an unstable estimator when $x_n$ and $s_n$, the high-pass filtered signal vector, are impulsive. Therefore, in a preferred embodiment of the present invention, the maximum signal energy is estimated by breaking the reference signal vector into small sub-vectors, squaring the sub-vectors and processing the sub-vectors to find the maximum over the tail length. The above may be expressed as:

$$r_x^{(n)} = \frac{1}{k} \sum_{i=0}^{k-1} x^2(n-1); \quad (c)$$

$$r_x(0)_{max} = \max\{r_x^{(n)}, r_x^{(n-k)}, r_x^{(n-2k)}, \ldots, r_x^{(n-L+K)}\}; \quad (d)$$

where $r_x(n)$ is the estimated power of signal vector $x_n$ at time n, calculated every k samples, and L is the length of the echo canceller filter as described in U.S. Pat. No. 5,295,136 and should be some integer multiple of k.

In another embodiment of the present invention, double-talk detection may be further enhanced by determining an energy of the adaptive echo canceller filter vector. As noted above, double-talk is detected when $r_s(0)$ is greater than a threshold of the estimated maximum signal energy. It follows from the above expression of $r_x(0)_{max}$ that the estimated maximum energy of a concentrated section of the echo canceller adaptive filter vector, $r_x(0)_{cs}$ is:

$$r_x(0)_{cs} = \max\{r_x^{[n-ik]}, r_x^{[n-(i+1)k]}, r_x^{[n-(i+2)k]}, \ldots, r_x^{[n-(j-1)k]}\} \quad (e)$$

where i and j are integer floor and ceiling functions:

$$i = \left\lfloor \frac{\Delta_1(n)}{k} \right\rfloor, \quad j = \left\lceil \frac{(\Delta_2(n)-1)}{k} \right\rceil,$$

respectively. It can be seen from the above that in the case where the concentrated section of the filter is equal to the entire filter length that $r_x(0)_{cs} = r_x(0)_{max}$, which is the desired default condition. This estimator of maximum reference power, as with $r_x(0)max$, may become inaccurate if x(n) is bursty. Therefore, $r_x(0)cs$ is kept from being artificially low by replacing $r_x(0)cs$ with $x^2(n)$ 110 when a sharp rise in reference energy is detected, 109. This can be expressed as:

$$\text{if } x^2(n) > A r_x(0)_{cs}, \text{ then } r_x(0)_{cs} = x^2(n), \quad (f)$$

where A is an empirical constant, in the preferred embodiment, typically about 16. Calculating the estimate maximum signal energy based upon the maximum of the concentrated section of the echo canceller adaptive filter vector improves double-talk detection by providing a more accurate less conservative maximum signal energy estimator.

The estimated power of the signal reflected from the PSTN, $r_s^{(n)}(0)$ is similarly determined as:

$$r_s^{(n)}(0) = \frac{1}{k} \sum_{i=0}^{k-1} s^2(n-i); \ 108. \quad (g)$$

The estimated reflected signal power is then compared to a fixed threshold of the estimated concentrated maximum signal energy, $r_x(0)_{cs}$, 112, and double-talk is detected, 114, if the estimated reflected signal power is greater than an adapted threshold of the estimated concentrated section maximum signal energy.

Once double-talk is detected, filter adaptation is inhibited, 126 If double-talk is not detected, the echo canceller adaptive filter vector coefficients are updated, 128. Also, the double-talk hangtime counter is initiated, 124, for setting the hangover period. If double-talk is not detected or the hangover period active, i.e., dtalk>0, the hangtime counter dtalk is decrement, 118.

Figure 6:
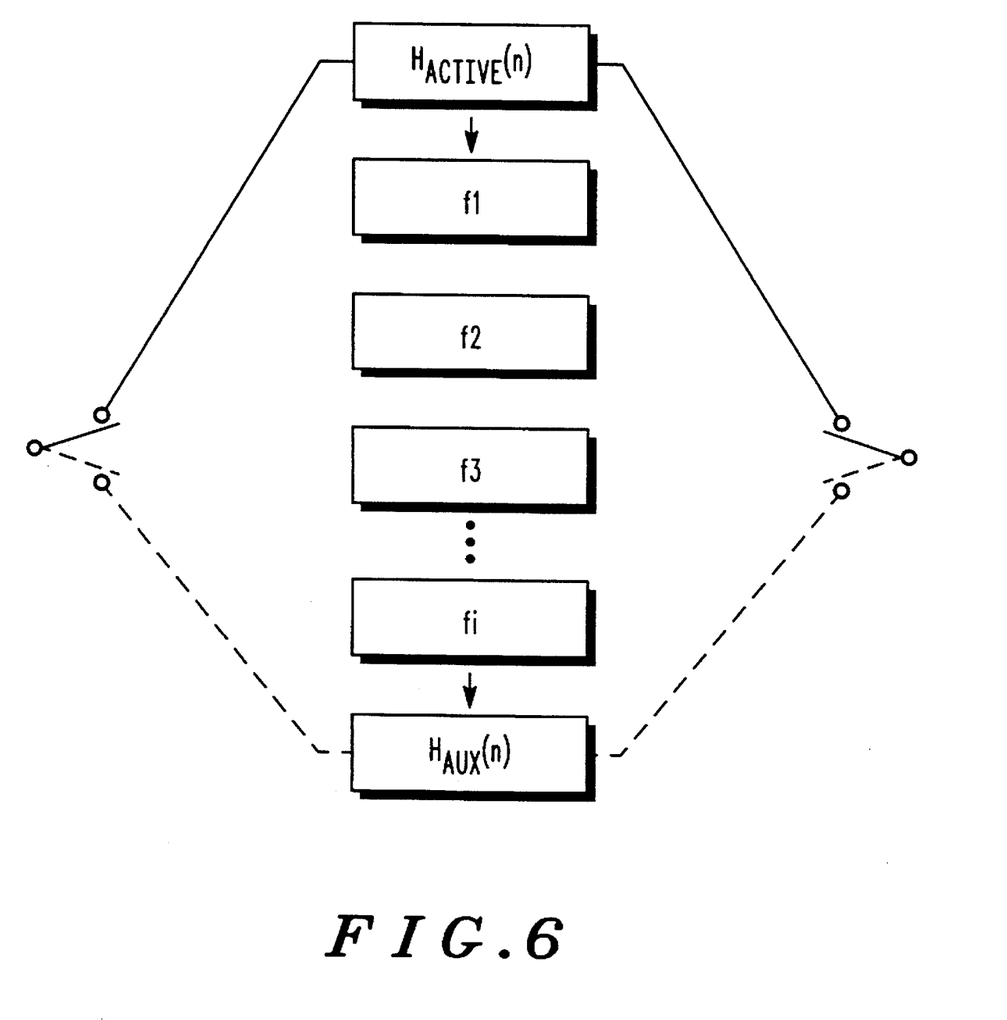
FIG. 6 is a block diagram illustrating the correction of the filter vector coefficients of the echo canceller upon detection of double-talk in accordance with a preferred embodiment of the present invention.

As illustrated in FIG. 6, in the absence of double-talk, echo is canceled within echo canceller 15 by subtracting an estimated echo replica based on the adaptive echo canceller filter vector, Hactive, from the return energy signal. The Hactive(n) filter vector coefficients are determined, 128, according to the method disclosed in the afore-mentioned U.S. Pat. No. 5,295,136. The background processing routine 200 within the base site controller 16 starts at 202, FIG. 5, and periodically samples the first set of vector coefficients and stores a sampled set of vector coefficients in an auxiliary echo canceller filter vector. The active filter coefficients Hactive(n) are copied into a stack buffer containing filter vectors f1, f2, . . . fi, i=1 to M, 224. In the preferred embodiment a stack buffer maintains the last 4, sets, f1–f4, of active filter coefficients. The background processing routine is executed at 20 milliseconds intervals, however, filter coefficients are only shifted into the stack buffer every N times through the background processing routine, 222, when double-talk is not presently detected 216, and preferably every fourth time through the routine to conserve processing resources. Upon shifting of the f1–f4 sets of filter vector coefficients, the f4 set of filter vectors is shifted to the auxiliary filter vector Haux(n), 224. In the present invention, Haux(n) is equal to the Hactive(n–NM20 ms), or the active filter vector coefficients from 320 milliseconds past. Processing intensive data copying is kept at a minimum by providing a circular buffer pointer which points to the oldest coefficients and by updating the buffer in place (i.e., copying the oldest coefficients to the auxiliary filter vector, Haux(n), and copying the active coefficients to the filter vector f1 and incrementing the stack buffer pointer). The background processing routine then returns at 220.

Echo canceller 15 is also operable for, in the presence of double-talk, subtracting an estimated echo replica based on the auxiliary echo canceller filter vector, Haux, from the return energy signal. As shown in FIG. 6 by the phantom line, when double-talk is detected, and the hangover period is not presently active, i.e., dtalk=0, 120, the Hactive(n) filter coefficients are replaced by the known "good" Haux(n) filter coefficients, 122, 218. In addition, filter adaptation is inhibited, 126. The shifting of filter vector coefficients is easily accomplished by generating a new pointer to the auxiliary filter coefficients Haux(n) without actually copying the coefficients.

Figure 7A:
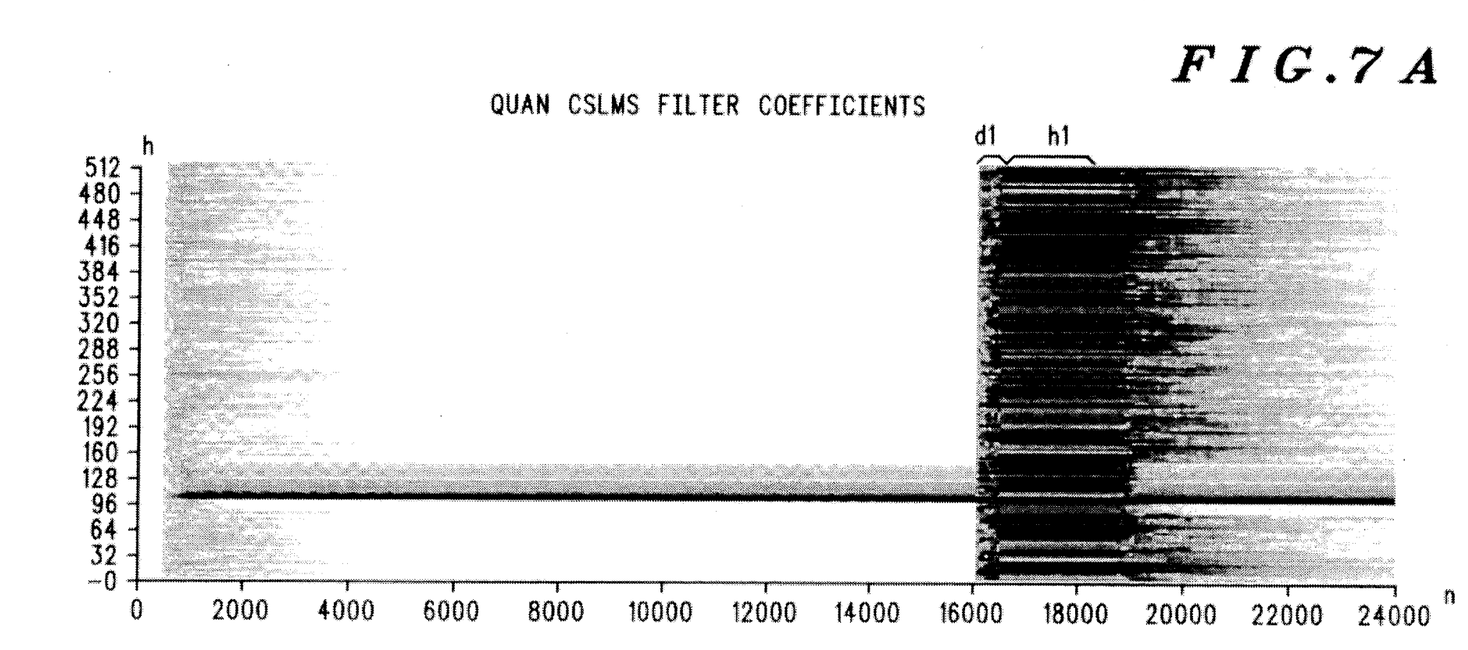
FIGS. 7A–7B is a chart illustrating the response of a double-talk detector in accordance with a preferred embodiment of the present invention.
Figure 7B:
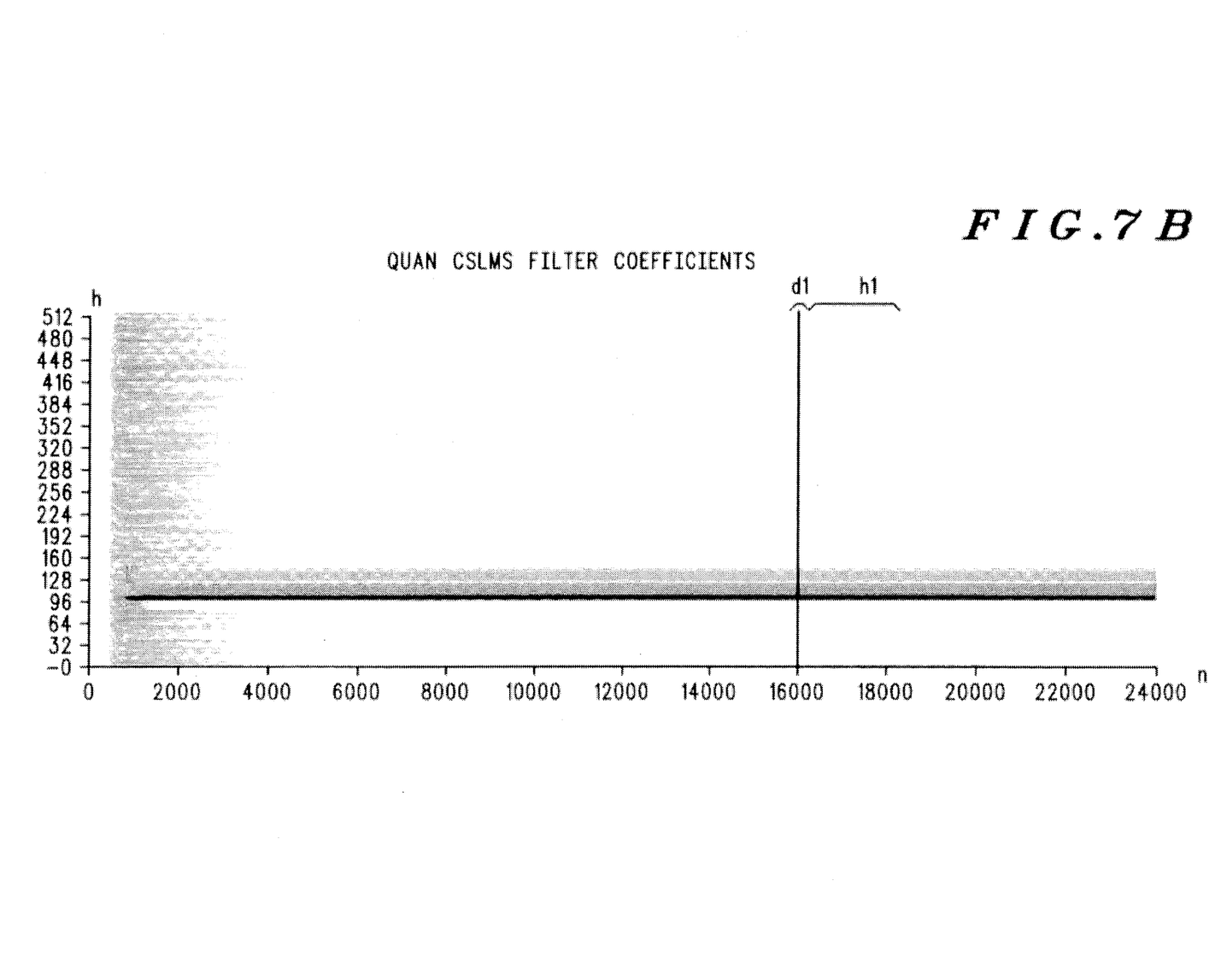

With reference to FIGS. 7A and 7B, there is shown a chart illustrating a simulation of the performance of the echo canceller with double-talk immunity of the present invention. As can be seen, after the echo canceller adaptation filter initially converges as described in the afore-mentioned U.S. Pat. No. 5,295,136, at time n=d, double-talk is introduced at the near-end portion. In FIG. 7A, it can be observed that a period d1 passes prior to double-talk detection. As can further be seen, during this period the echo canceller filter vector has significantly diverged. Furthermore, for a period h1, the hangover period following double-talk detection during which time filter adaptation is inhibited, the filter coefficients are frozen in this diverged state and significant echo canceller distortion occurs.

The chart of FIG. 7B illustrates a simulation of an echo canceller with double-talk according to the present invention. As can be seen from the chart, when double-talk is injected at the near end at time n=d, a period d1', substantially shorter than the period d1 shown in FIG. 7A, passes prior to detection. This illustrates the substantially earlier detection of double-talk by the echo canceller with double-talk immunity of the present invention. In spite of the early detection, echo canceller filter divergence still occurs. However, upon switching to the auxiliary echo canceller filter coefficients, Haux, the effects of filter divergence are minimized during the hangover period, h1' substantially improving the output of the echo canceller.

The present invention reduces effects of echo canceller filter divergence occurring during double-talk by providing for quick detection of double-talk and correction of adaptive echo canceller filter vector divergence. Echo canceller filter divergence can occur prior to double-talk detection and, in previous echo canceling system, was locked in due to inhibited echo canceller filter adaptation. In the present invention, after detection of double-talk echo canceller filter divergence is corrected.

The present invention has been described for exemplary purposes in terms of several preferred embodiments. It should be understood, however, that persons of ordinary skill in the art may otherwise embody its broad teachings without departing from its fair scope.

We claim:

1. A method of canceling an echo signal comprising the steps of:

a) providing an adaptive echo canceller filter vector having a first set of vector coefficients;

b) periodically sampling the first set of vector coefficients;

c) storing a sampled set of vector coefficients as an auxiliary echo canceller filter vector;

d) determining if double-talk is present;

e) if double-talk is absent, subtracting an estimated echo replica based on the adaptive echo canceller filter vector from a return energy signal reflected back from a transmit path; and f) if double-talk is present, subtracting an estimated echo replica based on the auxiliary echo canceller filter vector from the return energy signal.

2. The method of claim 1 wherein the step of subtracting the estimated echo replica based on the auxiliary echo canceller filter vector from the return energy signal comprises the step of substituting the sampled set of vector coefficients for the first set of vector coefficients.

3. The method of claim 1 wherein the step of detecting double-talk comprises the steps of:

determining an energy of the adaptive echo canceller filter vector;

forming an adaptive double-talk reference value proportional to the energy of the adaptive echo canceller filter vector; and comparing the return energy signal to the adaptive double-talk reference value.

4. An apparatus for canceling an echo signal in a communication system comprising:

a double-talk detector located between a near-end portion of the communication system and a far-end portion of the communication system, the double-talk detector operable to detect when a near-end speaker is talking; and an echo canceller located between the near-end portion and the far-end portion and in communication with the double-talk detector, the echo canceller operable for forming an estimated replica of the echo signal based on a first echo canceller filter vector if double-talk is absent and for forming the estimated replica of the echo signal based on a second echo canceller filter vector if double-talk is present, and for subtracting the estimated replica of the echo signal from a return energy signal communicated from the near-end portion to the far-end portion.

5. The apparatus of claim 4 wherein the double-talk detector comprises an adaptive double-talk threshold.

6. The apparatus of claim 4 wherein the first echo canceller filter vector comprises a set of adaptive filter vector coefficients.

7. The apparatus of claim 6 wherein the second echo canceller filter comprises a sampled set of adaptive filter vector coefficients.

8. The apparatus of claim 4 wherein the near-end portion comprises a public switch telephone network and the far-end portion comprises a cellular communication network.

9. The apparatus of claim 8 wherein the cellular communication network is a CDMA cellular communication network.

10. The apparatus of claim 8 wherein the cellular communication network is a TDMA cellular communication network.

11. A method of detecting double-talk comprising the steps of:

a) establishing an adaptive double-talk reference value;

b) estimating an energy of an echo canceller adaptive filter vector;

c) forming a double-talk threshold value from the adaptive double-talk reference value and the energy of the echo canceller adaptive filter vector; and d) comparing an estimated return signal energy to the double-talk threshold value.

12. The method of claim 11 further comprising the step of:

e) setting the double-talk threshold value equal to an initial double-talk threshold value if an adaptive threshold count is greater than a first threshold value and a fixed threshold count is less than a second threshold value.

13. The method of claim 11 wherein the step of forming a double-talk threshold value comprises the step of forming a product of the adaptive double-talk reference value and the energy of the echo canceller adaptive filter vector.

14. The method of claim 13 wherein the step of estimating an energy of an echo canceller adaptive filter vector further comprises estimating the energy of a concentrated section of the echo canceller adaptive filter vector.

15. The method of claim 13 wherein the step of establishing an adaptive double-talk reference value comprises the step of adapting the double-talk reference value in proportion to the estimated energy of an echo canceller adaptive filter vector.

16. The method of claim 15 wherein the step of forming an adaptive double-talk reference value comprises the step of adapting the double-talk reference value according to the equation $$d(n) = \gamma d(n-1) + (1-\gamma) B E_n;$$

where $E_n$ is the energy of the echo canceller filter at a time n; $d(0) = 0.25$ B, B is a headroom bias factor and $\gamma$ is an integration constant.

* * * * *